United States Patent
Bermal

(10) Patent No.: US 7,329,164 B2
(45) Date of Patent: Feb. 12, 2008

(54) PRESSURE ACTIVATED LATCH

(75) Inventor: Jay Velitario Bermal, San Diego, CA (US)

(73) Assignee: Apical Industries, Inc., Oceanside, CA (US)

( * ) Notice: Subject to any disclaimer, the term of this patent is extended or adjusted under 35 U.S.C. 154(b) by 0 days.

(21) Appl. No.: 11/361,821

(22) Filed: Feb. 24, 2006

(65) Prior Publication Data

US 2007/0202759 A1   Aug. 30, 2007

(51) Int. Cl.
*B63B 35/58* (2006.01)
*E05C 1/08* (2006.01)

(52) U.S. Cl. .................. 441/42; 292/144; 292/163; 292/164

(58) Field of Classification Search ............ None
See application file for complete search history.

(56) References Cited

U.S. PATENT DOCUMENTS

| | | | |
|---|---|---|---|
| 1,776,865 A | 9/1930 | Salisbury | |
| 2,264,321 A | 12/1941 | Manson | |
| 2,475,978 A | 7/1949 | Mill | |
| 3,144,224 A | 8/1964 | Carroll | |
| 3,973,744 A | 8/1976 | Hintzman | |
| 4,104,964 A | 8/1978 | Larkworthy et al. | |
| 4,254,974 A * | 3/1981 | Rolke et al. | ............ 292/259 R |
| 4,519,782 A | 5/1985 | Fisher | |
| 4,715,562 A | 12/1987 | Bokalot | |
| 4,866,963 A * | 9/1989 | Leininger et al. | .......... 70/278.2 |
| 5,360,186 A | 11/1994 | Danielson et al. | |
| 6,231,077 B1 | 5/2001 | Karolek et al. | |

* cited by examiner

*Primary Examiner*—Sherman Basinger
(74) *Attorney, Agent, or Firm*—Peter K. Hahn; Luce, Forward, Hamilton & Scripps, LLP

(57) ABSTRACT

A pressure activated latch includes a latch housing, a fluid inlet, a fluid outlet, an internal biasing member and a sliding latch pin that is configured to engage a latch tab that is substantially adjacent to the latch housing. The latch pin is slidable between a first position in which the latch pin prevents fluid communication between the fluid inlet and the fluid outlet and engages the latch tab and a second position in which the latch pin is disengaged from the latch tab and fluid communication is permitted between the fluid inlet and the fluid outlet. The internal biasing member is configured to apply a force upon the latch pin to bias it into the first position.

16 Claims, 8 Drawing Sheets

PRESSURE ACTIVATED LATCH

FIELD OF THE INVENTION

The present invention is directed to a pressure activated latch, and more particularly to a pressure activated latch for an emergency life raft on an aircraft.

BACKGROUND OF THE INVENTION

Emergency flotation devices are required on many aircraft to provide emergency assistance to passengers in the event the aircraft experiences an emergency situation and is forced down in water. Emergency flotation devices generally include systems designed to float the aircraft, systems for emergency life rafts and life vests for individual occupants.

One example of an airplane flotation system is shown in U.S. Pat. No. 1,776,865. The system includes inflatable bags located in a forward portion of an airplane and is manually operated by a pilot. The bags are stored in a non-inflated state within closed compartments. The system utilizes pressure cylinders to sequentially unlock doors of the compartments and inflate the inflatable bags. During operation the pilot activates the pressure cylinder by releasing pressurized gas. After inflation, the pilot is required to pull a cord that places the pressure cylinder into an intermediate position to block further fluid flow between the pressurized fluid. A first disadvantage of the system is that it does not provide for a valve that remains closed until a predetermined pressure is applied. As a result, any increase in pressure may cause the doors to unlock and the inflatable bags to inflate even when undesired. Another disadvantage is that it requires manual operation by the pilot even after the initial activation of the system.

U.S. Pat. No. 2,264,321 to Manson, describes a life-saving device that includes an inflatable life raft that is arranged in a compartment on the side of a vehicle such as an airplane. The compartment is closed by a pair of hinged doors that are spring-loaded to urge them into an opened position. The doors are held closed by pins that extend through meshing lugs that are included on the doors. A pull cord is secured to the pins and a valve on an inflating-gas container so that pulling on the cord sequentially removes the pins from the lugs and operates the valve to permit the flow of gas from the container to the raft. The cord fully disengages from the gas container after the valve is operated. A first disadvantage of the system is that the pins may be disengaged without a complete activation of the system. In addition, the pull cord may become bound which may result in the pin disengaging without activation of the gas container. A further disadvantage is that there is that the gas container valve does not include a mechanism to close the gas path between the gas container and the raft after the raft is inflated.

In view of the above, there exists a need for a pressure activated latch for an emergency flotation system that provides sequential unlatching and inflation, that will unlatch when subjected to a pressure above a predetermined threshold pressure and that will automatically prevent fluid communication between the pressurized fluid source and the inflatable after inflation.

SUMMARY OF THE INVENTION

In view of the foregoing, it is an object of the present invention to provide a pressure activated latch for an emergency flotation system that provides sequential unlatching of an emergency door and inflation of a flotation device.

It is another object of the invention to provide a pressure activated latch for use in an emergency flotation system that is internally biased so that it remains closed until a predetermined pressure is applied.

It is another object of the invention to provide a pressure activated latch for an emergency flotation system that returns to a closed position after a flotation device has been adequately inflated.

In the preferred embodiment of the invention, a pressure activated latch includes a latch housing, a fluid inlet, a fluid outlet, a latch pin and an internal biasing element. The latch pin includes an interface portion that extends out of the latch housing and is designed to engage a latch tab included on an emergency flotation system door. The latch pin also includes a sealing portion that creates a slidable fluid seal within the latch housing. The internal biasing element creates a biasing force that is chosen so the latch pin is biased to engage a latching tab while still providing a seal between the fluid inlet and fluid outlet.

The latch is configured so that when a pressurized fluid is injected into the fluid inlet it causes the latch pin to slide within housing thereby sequentially unlocking the emergency door and inflating the inflatable device. After the inflatable device is inflated, the pressure at the inlet and out let equalize and the internal biasing element returns the pin to the original biased position where the sealing portion is again located between the fluid inlet and the fluid outlet and prevents fluid communication therebetween.

These and other features and advantages of the present invention will be appreciated from review of the following detailed description of the invention, along with the accompanying figures in which like reference numerals refer to like parts throughout.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
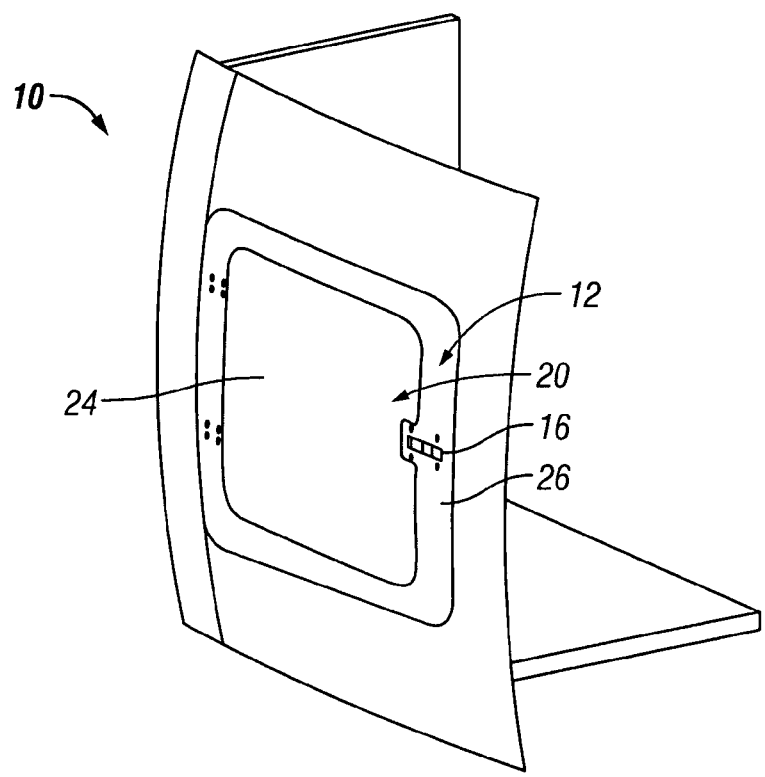
FIG. 1 is a perspective view of a side panel of an aircraft having a baggage compartment door in a closed configuration.

Referring to FIGS. 1, a panel 10 on the fuselage of an aircraft, such as a helicopter, includes a baggage compartment door 12 that provides access to a baggage compartment. An emergency life raft kit 14 is incorporated into baggage compartment door 12. Life raft kit 14 (not shown in FIG. 1) is located in door 12 because it is easily accessible for installation and maintenance by releasing a baggage compartment door latch 16 and opening door 12. However, it should be appreciated that emergency life raft kit 14 may be located anywhere on the aircraft including a dedicated life raft storage compartment.

Life raft kit 14 generally includes a storage compartment 18, a life raft (not shown), a pressurized fluid source (not shown) and a pressure activated latching assembly 19 that includes one or more latches 28. Storage compartment 18 includes an emergency door 20 that may be opened to expose the life raft contained therein. Compartment 18 is fixed to an inner surface 22 of compartment door 12 and extends through compartment door 12 so that emergency door 20 is exposed at the outer surface of panel 10. Preferably, compartment 18 is mounted to compartment door 12 so that an outer surface 24 of emergency door 20 is flush with, or recessed from, an outer surface 26 of compartment door 12. Latching assembly 19 may also be fixed to inner surface 22 of compartment door 12. It should be appreciated that compartment 18 and latching assembly 19 may be fixed to compartment door 12 by any technique known in the art. For example, mounting flanges 21 may be provided on each of the components and mechanical fasteners may be used to fix mounting flanges 21 to compartment door 12.

Figure 2:
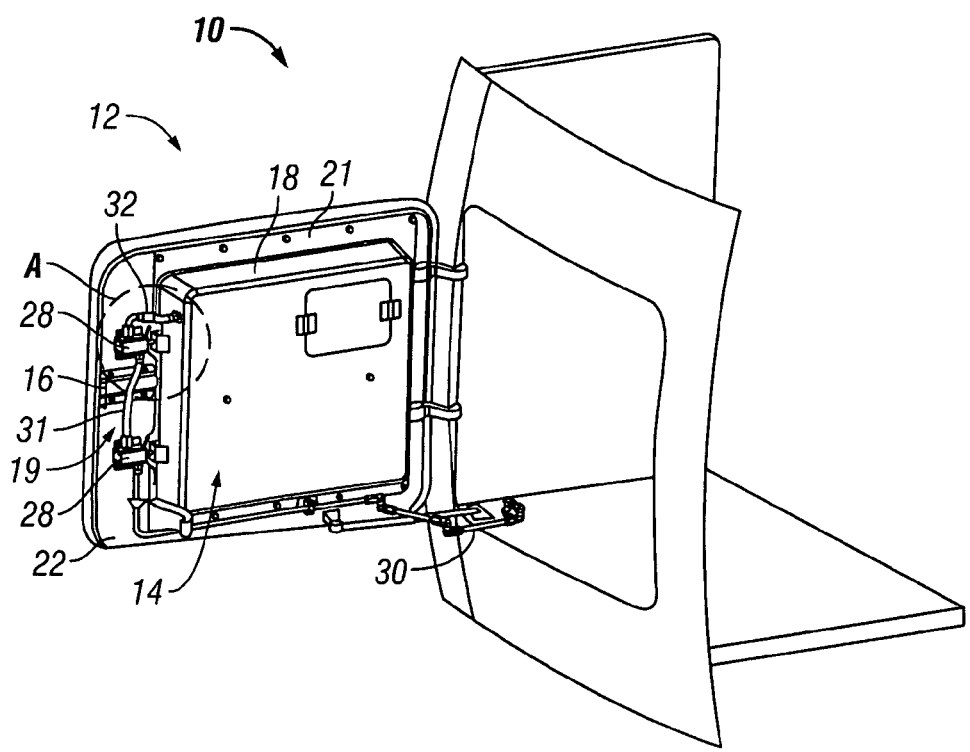
FIG. 2 is a perspective view of a side panel of an aircraft having a baggage compartment door in an open configuration and including an emergency life raft kit.
Figure 3:
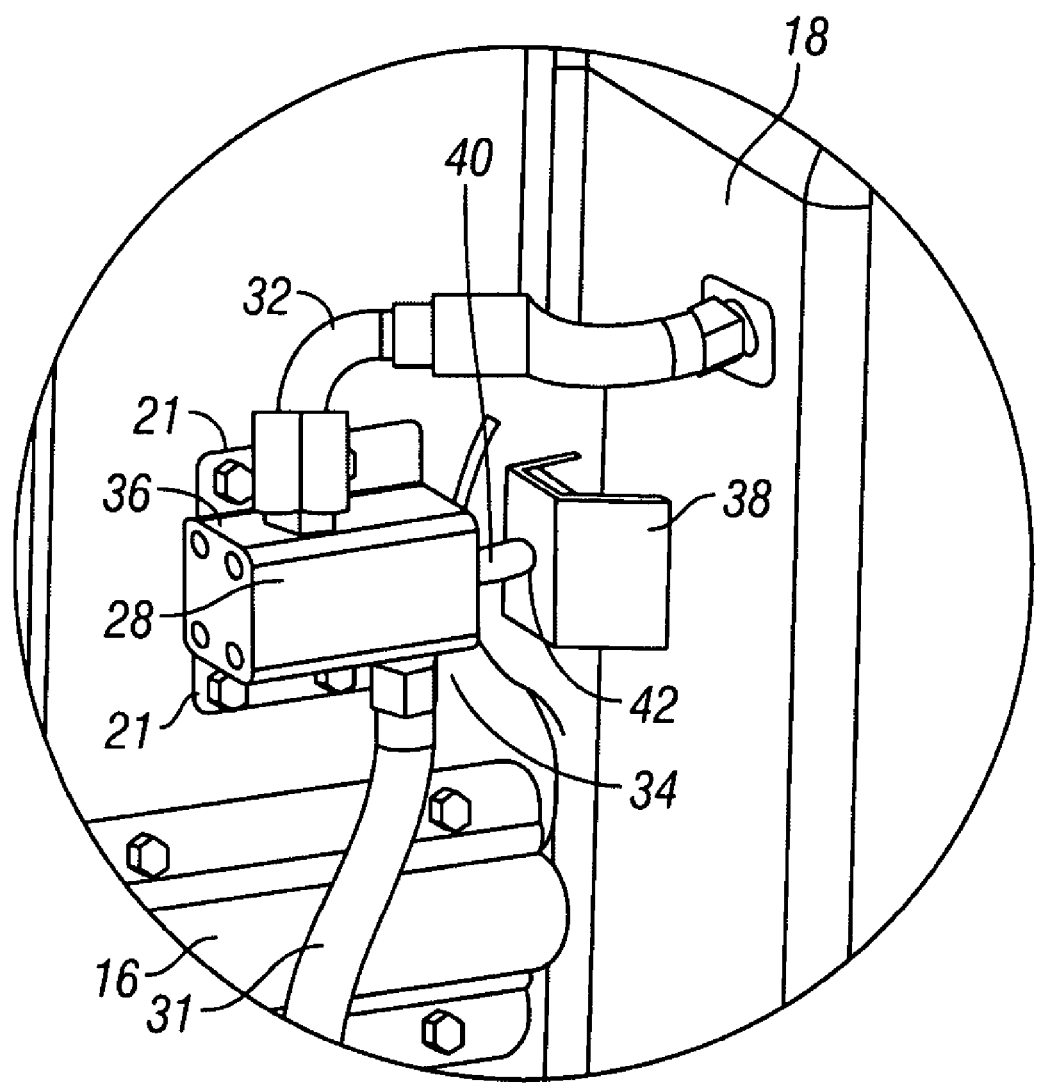
FIG. 3 is an enlarged detail view of a portion A, shown in FIG. 2, of the emergency life raft kit including a pressure activated latch in accordance with the principles of the present invention.

As will be described in greater detail below, advantages of latching assembly 19 over known latching assemblies for emergency flotation devices include that latches 28 passively control the sequential unlatching of emergency door 20 and inflation of the life raft in addition to being internally biased to a position where there is no fluid communication between the fluid source and the life raft. In addition, those advantages are available in a small, self-contained, easily serviceable latch. Referring to FIGS. 2 and 3, latching assembly 19 generally includes two latches 28 and a plurality of pressure lines 30, 31, 32 that fluidly couple latches 28 and the life raft to the pressurized fluid source. In particular pressure line 30 extends between the pressurized fluid source and a first latch 28. In the present embodiment, the pressurized fluid source is not located on compartment door 12 so at least a portion of fluid line 30 is configured to extend across the interface of the storage compartment and compartment door 12. The end of pressure line 30, opposite to the pressurized fluid source, terminates at an inlet 34 of first latch 28. Pressure line 31 is coupled to an outlet 36 of first latch 28 and extends to an inlet 34 of second latch 28. Finally, pressure line 32 extends from outlet 36 of second latch 28 to the life raft that is housed in compartment 18 in a deflated state.

Emergency door 20 includes a latch tab 38 that corresponds to each latch 28 and a latch pin 40 included in each latch 28 interfaces with a latch tab aperture 42 in each latch tab 38 to selectively lock emergency door 20 in a closed position. Latch pin 40 is configured to be biased toward a latched configuration (i.e., toward latch tab 38 into aperture 42) by an internal biasing member. During operation, latch pin 40 may be forced into an unlatched configuration (i.e., away from latch tab 38 and out of aperture 42) by a fluid pressure increase within the respective latch 28 caused by a release of pressurized fluid from the pressurized fluid source into pressure lines 30 and 31.

Figure 4:
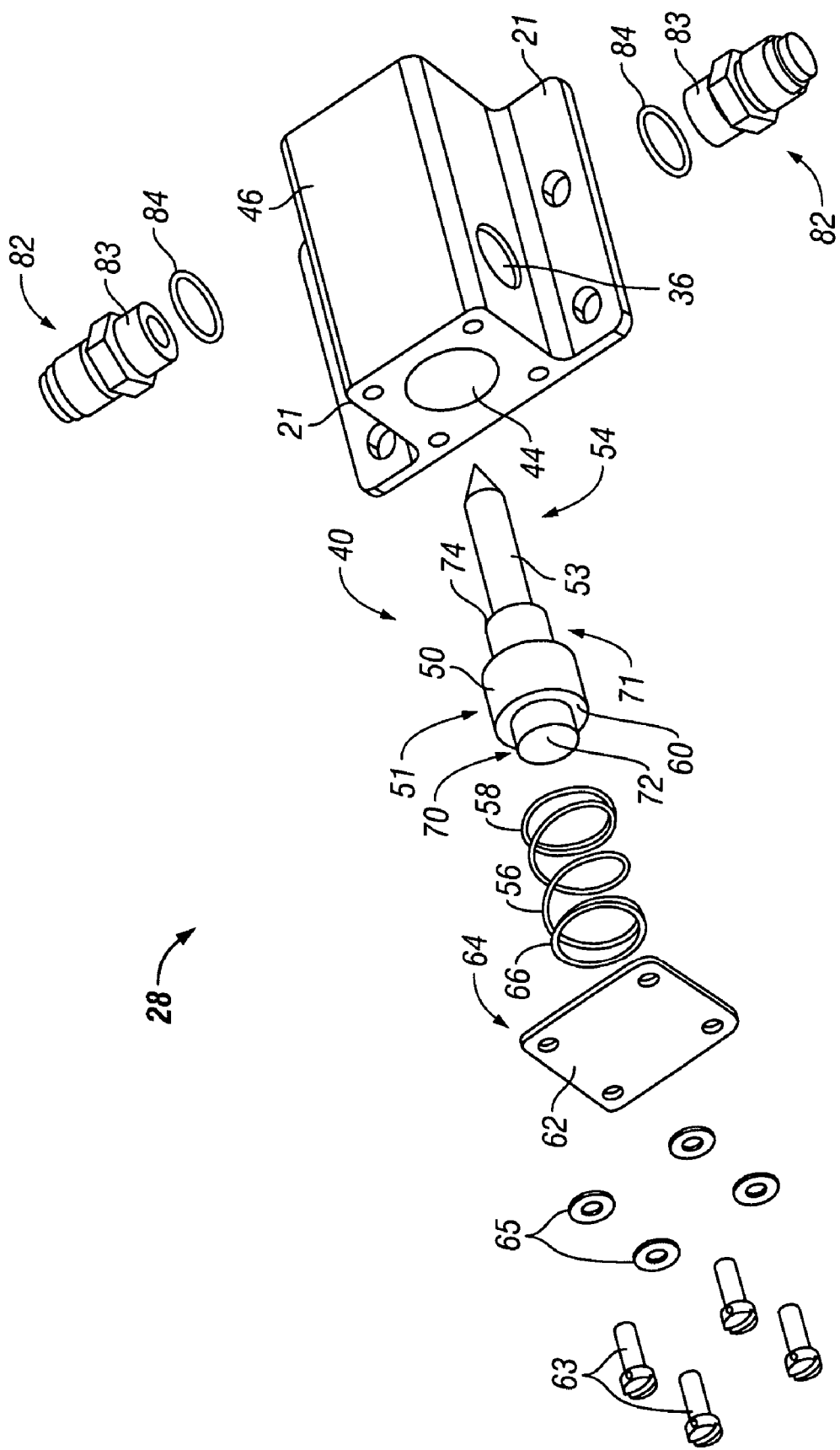
FIG. 4 is an exploded view of the pressure activated latch of FIG. 3.
Figure 5:
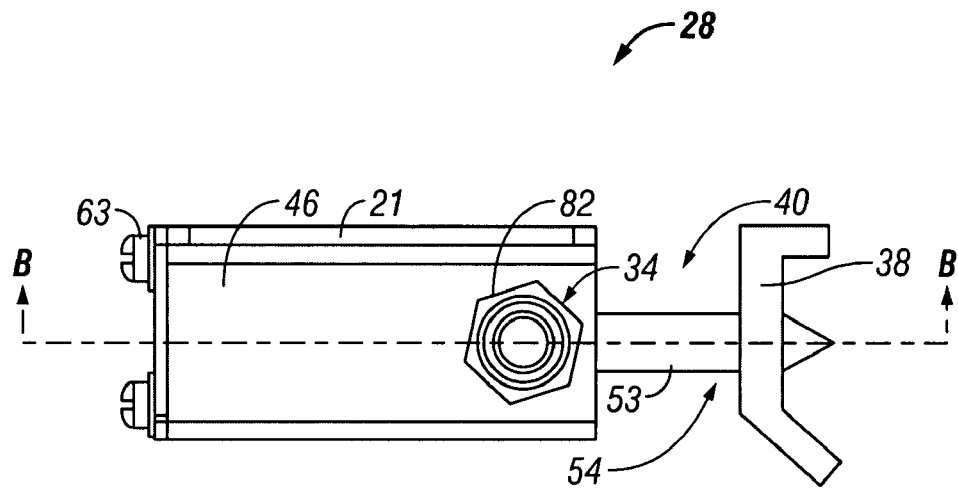
FIG. 5 is a side view of the pressure activated latch of FIG. 3 in a latched configuration.
Figure 6:
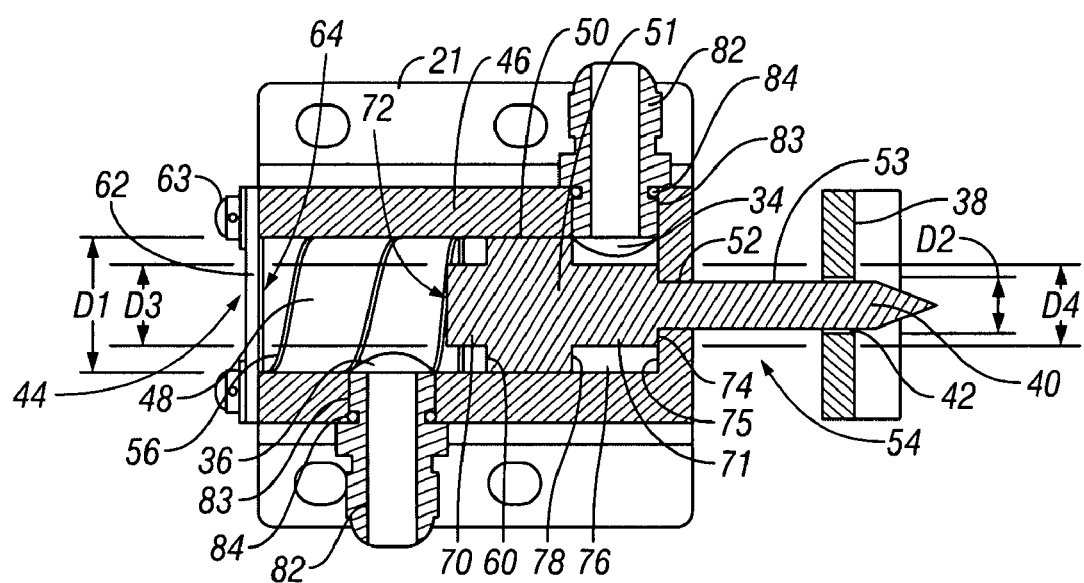
FIG. 6 is a cross-sectional view of the pressure activated latch taken along line B-B of FIG. 5.

Referring to FIGS. 4-6, the structure of each latch 28 will be described. Latch 28 includes latch pin 40 that extends longitudinally through a latch housing 46. Latch pin 40 is slidably received within a bore 44 of housing 46 so that latch pin 40 is movable between an extended, latched configuration (shown in FIGS. 5 and 6) and a retracted, unlatched configuration (shown in FIGS. 7 and 8), as will be discussed in greater detail below.

Figure 11:
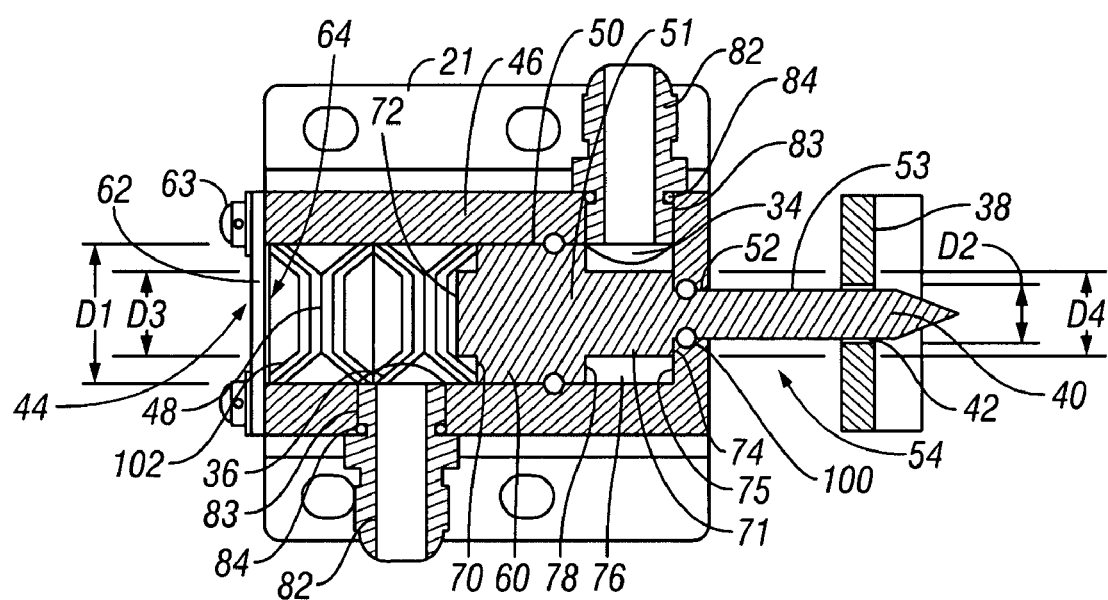
FIG. 11 is a cross-sectional view of another embodiment of the pressure activated latch in a latched configuration.

Bore 44 includes a proximal portion 48 that has a first diameter D1 that approximates the diameter of a sealing surface 50 of an enlarged sealing portion 51 of latch pin 40. The interface between sealing surface 50 and the internal surface of proximal portion 48 of bore 44 provides a fluid seal that prevents pressurized fluid from flowing past enlarged portion 51 during operation. A distal portion 52 of bore 44 has a second diameter D2 that approximates the diameter of a sealing surface 53 of an interface portion 54 of latch pin 40. Interface portion 54 extends through distal portion 52 of bore 44 out of latch housing 46. The interface between sealing surface 53 and distal portion 52 provides a sliding seal so that pressurized fluid injected into latch housing 46 is prevented from escaping from latch housing 46. It should be appreciated that one or more sealing members may also be provided at the sliding interfaces. For example, one or more O-rings 100 or compressible collars may be provided for the seals at sealing surfaces 50 and 53, as shown in FIG. 11.

A biasing force is exerted on latch pin 40 by an internal biasing element, such as biasing spring 56. Spring 56 is located proximal to latch pin 40 within proximal portion 48 of bore 44. A distal end 58 of spring 56 interfaces with a spring interface surface 60 that is located on enlarged portion 51 of latch pin 40. A cover 62 is coupled to the proximal end of latch housing 46 with mechanical fasteners 63 and optional washers 65 and prevents spring 56 from translating out of bore 44 when latch pin 40 is moved proximally. Cover 62 also provides a spring interface surface 64 that interfaces with a proximal end 66 of spring 56 so that spring 56 may be compressed between spring interface surface 64 of cover 62 and spring interface surface 60 of latch pin 40, to place a biasing force upon latch pin 40. It should be appreciated that the internal biasing member may be any device that is located internal to latch 28 that is capable of placing a biasing force on latch pin 40. For example, the internal biasing member may be any type of spring such as a helical spring or, as shown in FIG. 11, belville spring washers 102. Alternatively, the internal biasing member may be a magnet oriented to bias the latch pin 40 into the latched configuration.

The translation of latch pin 40 within bore 44 is limited in both the proximal and distal directions by travel limit stops. In the present embodiment, the travel of latch pin 40 is limited by travel limit stops that are included on latch pin 40. In particular, travel of latch pin 40 in the proximal direction is limited by a first travel limit stop (first step portion 70) and travel in the distal direction is limited by a second travel limit stop (second step portion 71). First step portion 70 is located proximal of enlarged portion 51 and forms a proximal end 72 of latch pin 40. Step portion 70 has an outer diameter D3 that is smaller than diameter D1 of enlarged portion 51 of latch pin 40 and the difference in diameters D1 and D3 creates spring interface surface 60 described above. The length of step portion 70 is chosen so that proximal end 72 contacts cover 62 when latch pin 40 is translated to a desired proximal-most position corresponding to the unlatched configuration. It should be appreciated, however, that spring 56 may be chosen so that the translation of latch pin 40 is limited by compression of spring 56 rather than contact between proximal end 72 of latch pin 40 and cover 62.

Second step portion 71 of latch pin 40 is located between enlarged portion 51 and interface portion 54 and includes a diameter D4 that is smaller than diameter D1 but larger than diameter D2. The difference between diameters D2 and D4 creates a shoulder 74 that is too large to translate into distal portion 52 of bore 44. As a result, the travel of latch pin 40 is limited by contact between shoulder 74 and a shoulder 75 that is located at the interface of proximal portion 48 and distal portion 52 of bore 44.

Latch inlet 34 and latch outlet 36 are provided through latch housing 46 and into bore 44. Inlet 34 is located near a distal end of bore 44 so that pressurized fluid may be injected into bore 44 to translate latch pin 40 proximally. As mentioned above, diameter D3 of step portion 71 differs from diameter D1 and creates an empty space 76 around step portion 71 when latch pin 40 is in a distal-most position. The length and diameter of step portion 71 and the location of inlet 34 are chosen so that inlet 78 is in fluid communication with empty space 76 when latch pin 40 is located in the distal-most position. Outlet 36 is located proximal of inlet 34 so that when latch pin 40 is located in the distal-most position enlarged portion 51 is located between inlet 34 and outlet 36 and prevents fluid communication between inlet 34 and outlet 36. The location of outlet 36 is also chosen so that when latch pin 40 is in a proximal-most position, enlarged portion 51 is located further proximal from outlet 36, thereby allowing fluid communication between inlet 34 and outlet 36 via bore 44.

Fluid connection ports 82 may be provided at each inlet 34 and outlet 36 so that fluid lines 30,31,32 may be conveniently coupled to respective latch assemblies 28. Each port 82 includes a threaded surface 83 that is configured to be received by a threaded surface in a respective inlet 34 or outlet 36. Preferably, an O-ring 84 is provided with each port 82 to seal port 82 to the respective inlet 34 or outlet 36. Ports 82 may be any fluid connection port known in the art that provide a sealable interface with a fluid line. For example, fluid connection ports 82 may be compression fittings.

Figure 7:
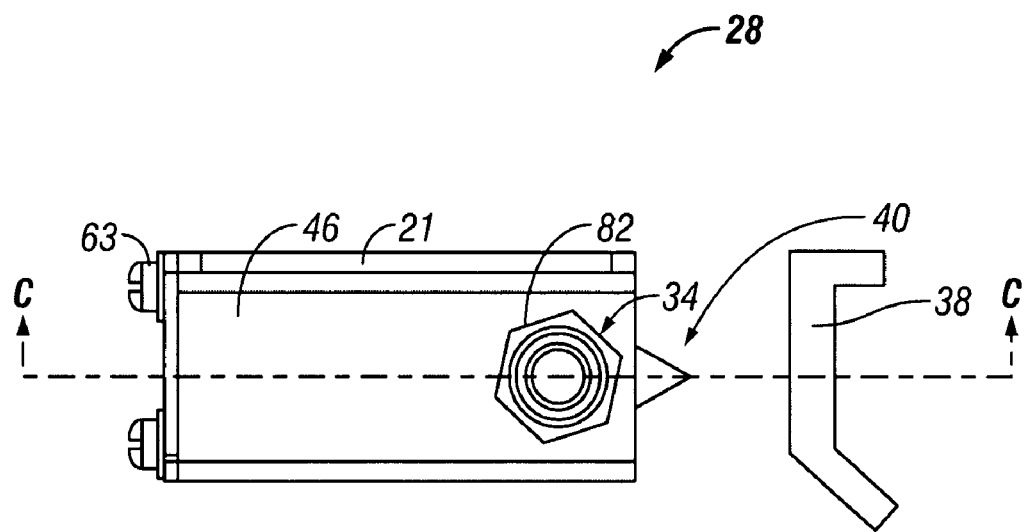
FIG. 7 is a side view of the pressure activated latch in an unlatched configuration.
Figure 8:
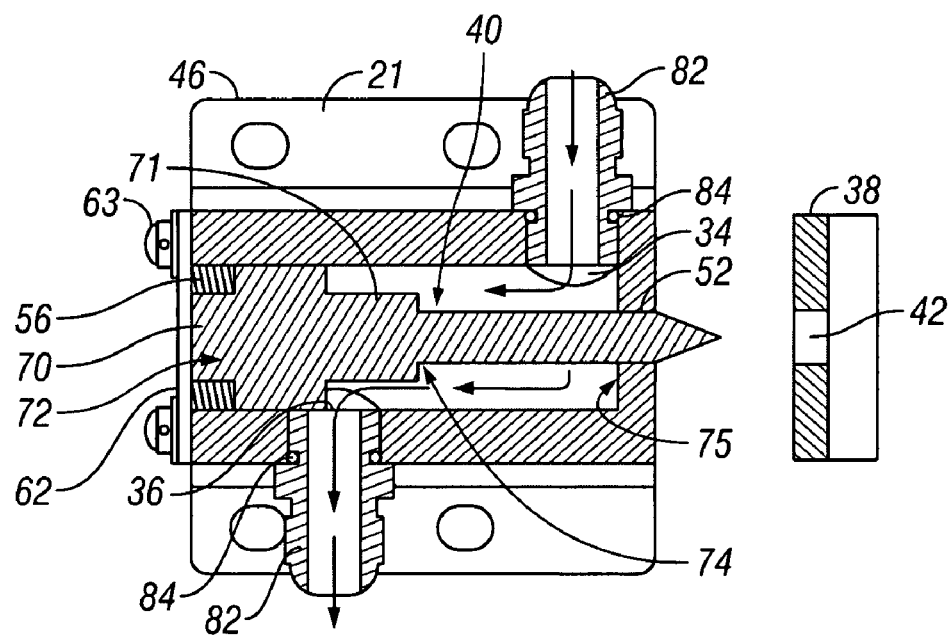
FIG. 8 is a cross-sectional view of the pressure activated latch taken along line C-C of FIG. 7.

During operation, latch 28 transforms from a latched configuration, shown in FIGS. 5 and 6, to an unlatched configuration, shown in FIGS. 7 and 8. As described above, that transformation allows emergency door 20 to open so that an inflatable flotation device, such as an emergency life raft, may be ejected from compartment 18 when it is inflated. During normal operation of an aircraft, there is no pressurized fluid injected into pressure lines 30, 31, 32 or bore 44 and latch 28 is maintained in the latched configuration by spring 56 and the distal travel of latch pin 40 is limited by contact between shoulder 74 of latch pin 40 and shoulder 75 of bore 44. Additionally, interface portion 54 of latch pin 40 extends out of latch housing 46 and is received by latch tab aperture 42 of an adjacent latch tab 38. Fluid communication between inlet 34 and outlet 36 also is prevented by the sealing interface of enlarged portion 51 of latch pin 40 with bore 44 between inlet 34 and outlet 36.

During an emergency event, pressurized fluid is released from the pressurized fluid source and enters latch 28 through inlet 34. The pressurized fluid passes through inlet 34 and enters space 76 and increases the fluid pressure within space 76. The increased pressure within space 76 applies a force to a face 78 of latch pin 40 that is directed proximally. The pressure of the fluid and the spring constant of spring 56 are chosen so that the force applied to face 78 when the pressurized fluid is released is sufficient to overcome the spring force created by 56 and to move latch pin 40 proximally, thereby placing latch 28 in the unlatched configuration.

When latch 28 is in the unlatched configuration, as shown in FIGS. 7 and 8, latch pin 40 is located in a proximal position that results in interface portion 54 disengaging from aperture 42 of latch tab 38, thereby releasing emergency door 20. In addition, as latch pin 40 moves proximally, enlarged portion 51 is moved proximal of outlet 36, thereby placing inlet 34 in fluid communication with outlet 36. The pressurized fluid that is injected into bore 44 is then able to flow past latch pin 40, through outlet 36 and further to an additional series connected latch 28 or an inflatable device. Latch pin 40 may be moved proximally until it reaches a proximal-most position in which the travel of latch pin 40 is limited by contact between proximal end 72 of latch pin 40 and cover 62.

It should be appreciated that the components of latch 28 and latch tab 38 are dimensioned so that interface portion 54 disengages aperture 42 of latch tab 38 completely before enlarged portion 51 has moved sufficiently to allow communication between inlet 34 and outlet 36. As a result, latch 28 inherently controls the sequence of the release of emergency door 20 and the inflation of an inflatable device that is downstream.

In addition, the biasing force applied by spring 56 assures that latch 28 automatically ends fluid communication between inlet 34 and outlet 36 when the pressure within bore 44 has dropped to a predetermined value after the inflatable device is inflated. As a result, latch 28 automatically ends fluid communication between the pressurized fluid source and the inflatable device after sufficient inflation.

Figure 9:
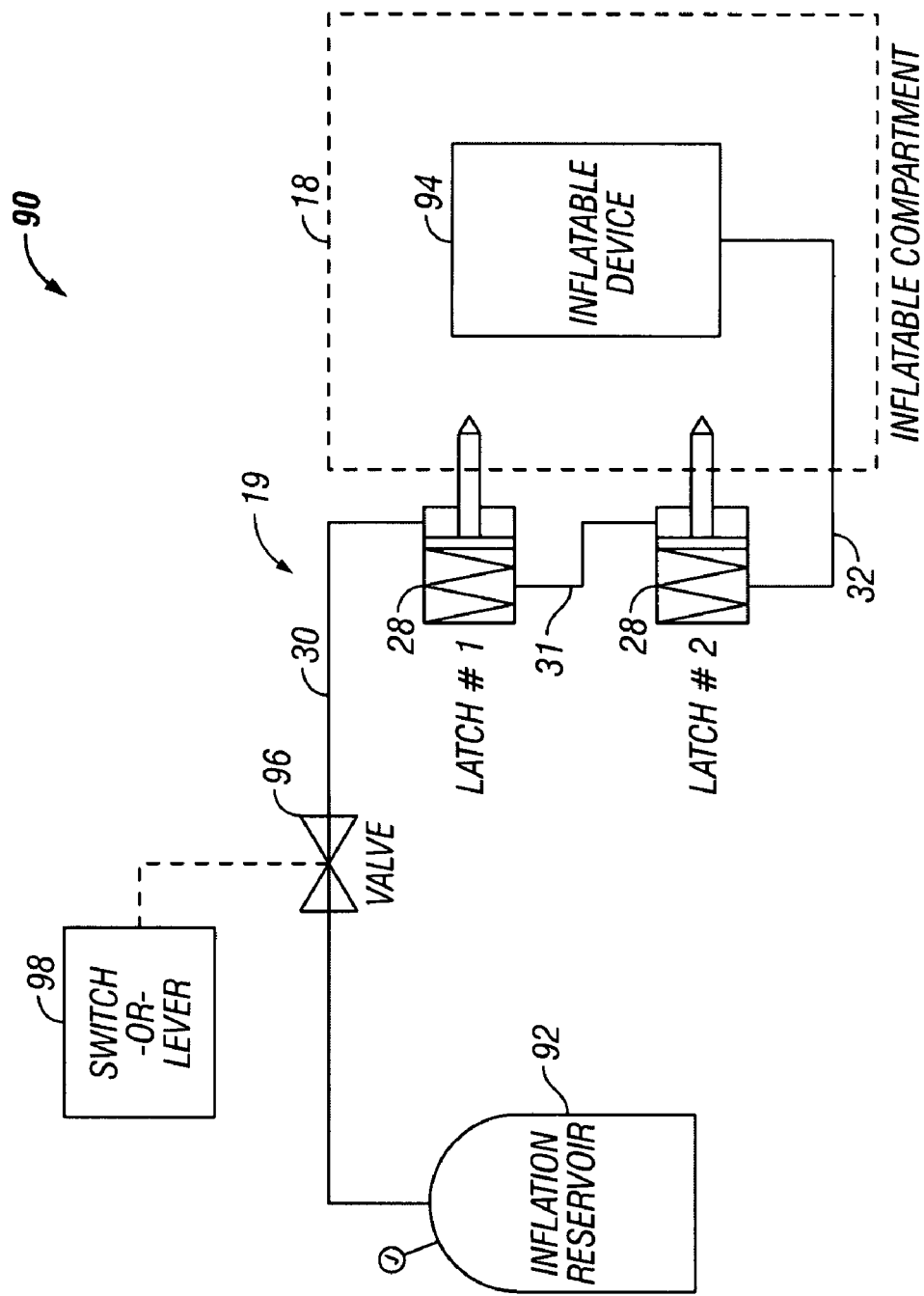
FIG. 9 is a schematic of an embodiment of an emergency flotation system incorporating the pressure activated latch in accordance with the present invention.
Figure 10:
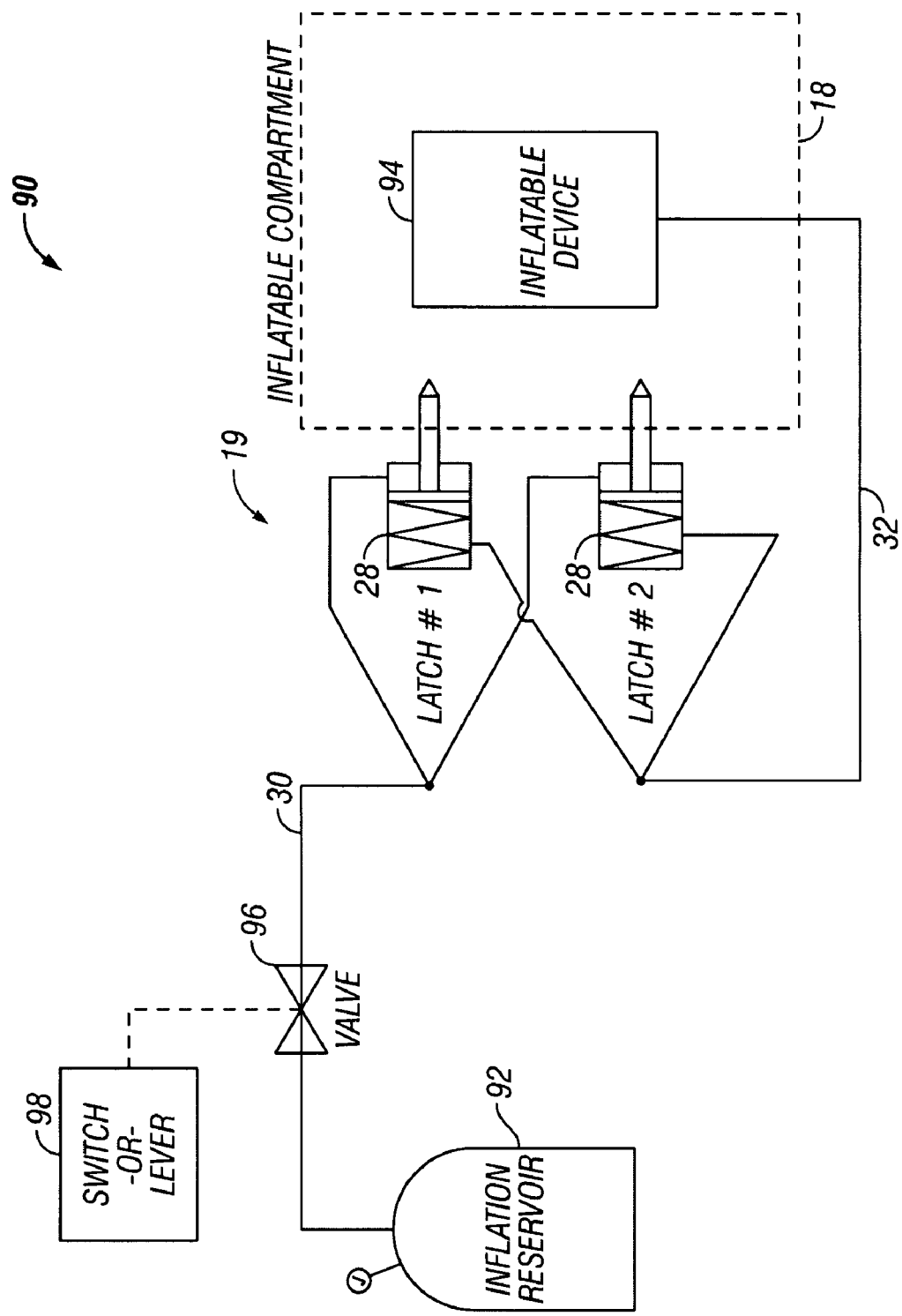
FIG. 10 is a schematic of another embodiment of an emergency flotation system incorporating the pressure activated latch in accordance with the present invention.

Referring to FIGS. 9 and 10, schematics of alternative embodiments of an emergency flotation system 90 will be described. As generally described above, emergency flotation system 90 includes a pressurized fluid source, such as an inflation reservoir 92 that stores a pressurized gas, such as air or nitrogen, for selectively inflating an inflatable device 94, such as a life raft. A pressure line 30 fluidly links inflation reservoir 92 with latching assembly 19 through a valve 96. Valve 96 is normally closed so that fluid communication between inflation reservoir 92 and latching assembly 19 is prevented. In an emergency, the system may be activated by an electronic switch in the cockpit or a manual lever 98. Activation of switch or lever 98 allows pressurized fluid to be injected into latching assembly 19, which activates one or more latches 28, and into inflatable device 94. It should be appreciated that latches 28 may be connected either in series (shown in FIG. 9) or parallel (shown in FIG. 10) with inflation reservoir 92 as desired.

A series connection between latches 28 provides sequential unlatching of the plurality of latches which is followed by inflation of inflatable device 94. A series connection may be used to reduce the length of pressure line required for the system. A parallel connection between latches 28 and inflation reservoir 92 allows the plurality of latches to be unlatched simultaneously with the inflation of inflatable device 94 thereafter. In a parallel system, an inlet of each latch 28 is directly coupled to inflation reservoir 92 through pressure line 30 and an outlet of each latch is directly coupled to inflatable device 94. In the parallel system a pressure line 31 between an outlet of the first latch 28 and an inlet of the second latch 28 would not be required.

One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

What is claimed is:

1. A pressure activated latch for latching an emergency door of an aircraft emergency flotation system, comprising:
   a latch housing including a fluid inlet and a fluid outlet spaced longitudinally from the fluid inlet;
   a latch pin including an interface portion that extends out of the latch housing in a latched position and a sealing portion, the latch pin being configured to slide within the latch housing between the latched position and an unlatched position in which the interface portion is retracted into the latch housing; and
   an internal biasing element disposed within the latch housing and configured to bias the latch pin to the latched position,
   wherein the interface portion of the latch pin is engaged with a latch tab of the emergency door and the sealing portion of the latch pin is configured to prevent fluid communication between the fluid inlet and the fluid outlet when the latch pin is in the latched position, and
   wherein the interface portion of the latch pin is disengaged from the latch tab of the emergency door and the sealing portion of the latch pin is configured to allow fluid communication between the fluid inlet and the fluid outlet when the latch pin is in the unlatched position.

2. The pressure activated latch of claim 1, wherein the latch tab is substantially adjacent to the latch housing when the latch pin is in the latched position.

3. The pressure activated latch of claim 1, wherein the latch housing includes a longitudinal bore and the sealing portion of the latch pin slides within the longitudinal bore.

4. The pressure activated latch of claim 3, wherein the fluid inlet is in fluid communication with the longitudinal bore substantially adjacent to a first end of the longitudinal bore and the fluid outlet is in fluid communication with the longitudinal bore substantially adjacent to a second end of the longitudinal bore.

5. The pressure activated latch of claim 1, further comprising at least one sealing member configured to create a fluid seal between the latch pin and the latch housing.

6. The pressure activated latch of claim 5, wherein the sealing member is an O-ring.

7. The pressure activated latch of claim 1, wherein the internal biasing element is a helical spring.

8. The pressure activated latch of claim 1, wherein the internal biasing element is a plurality of belville spring washers.

9. The pressure activated latch of claim 1, wherein the latch pin is configured to slide away from the latch tab when moving from the latched position to the unlatched position.

10. The pressure activated latch of claim 9, wherein the outlet is located further proximal from the latch tab than the fluid inlet.

11. The pressure activated latch of claim 1, wherein the latch pin includes a travel limit stop that is configured to limit the travel of the latch pin so that the sealing portion is spaced from the fluid inlet when the latch pin is in the latched position.

12. An emergency flotation system, comprising
   a pressurized fluid source;
   an inflatable device storage compartment including a lid and lid latching tabs;
   a plurality of pressure activated latches configured to selectively engage the lid latching tabs, wherein each pressure activated latch includes a latch housing that includes a fluid inlet spaced from a fluid outlet, a latch pin including a sealing portion that is slidable within the latch housing such that an interface portion of the latch pin is translatable between a first extended position and a second retracted position in which the interface portion is retracted into the latch housing, and an internal biasing element disposed within the latch housing and configured to bias the latch pin to the first extended position, wherein in the first extended position the latch pin prevents fluid communication between the inlet and the outlet and the interface portion of the latch pin is engaged with a respective lid latching tab, wherein in the second retracted position fluid communication between the inlet and the outlet is permitted and the interface portion of the latch pin is disengaged from the lid latching tab, and wherein the pressure activated latches are fluidly coupled to each other; and
   an inflatable device coupled in fluid communication with the pressurized fluid source through the plurality of pressure activated latches.

13. The emergency flotation system of claim 12, wherein the plurality of pressure activated latches are fluidly coupled to each other in series.

14. The emergency flotation system of claim 12, wherein the plurality of pressure activated latches are fluidly coupled to each other in parallel.

15. The emergency flotation system of claim 12, further comprising a pressure valve interposed between the pressurized fluid source and the plurality of pressure activated latches.

16. The emergency flotation system of claim 15, wherein the pressure valve is configured to be operated remotely.

* * * * *